United States Patent  
Smith et al.

(10) Patent No.: US 8,671,212 B2
(45) Date of Patent: *Mar. 11, 2014

(54) METHOD AND SYSTEM FOR PROCESSING RAW FINANCIAL DATA STREAMS TO PRODUCE AND DISTRIBUTE STRUCTURED AND VALIDATED PRODUCT OFFERING OBJECTS

(75) Inventors: Andrew J. R. Smith, New York, NY (US); Deane Thomas, New York, NY (US); Randy Cowan, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 13/090,793

(22) Filed: Apr. 20, 2011

(65) Prior Publication Data

US 2011/0196839 A1  Aug. 11, 2011

Related U.S. Application Data

(63) Continuation of application No. 09/871,427, filed on May 31, 2001, now Pat. No. 7,958,025.

(60) Provisional application No. 60/223,397, filed on Aug. 4, 2000, provisional application No. 60/227,162, filed on Aug. 22, 2000.

(51) Int. Cl.
*G06F 15/16* (2006.01)

(52) U.S. Cl.
USPC ........... 709/231; 709/219; 709/246; 709/250; 705/36 R; 707/790

(58) Field of Classification Search
USPC ............... 709/231, 219, 246, 250; 705/36 R; 707/790
See application file for complete search history.

(56) References Cited

U.S. PATENT DOCUMENTS 4,868,866 A * 9/1989 Williams, Jr. ................. 709/213
5,812,987 A   9/1998 Luskin et al.

(Continued)

FOREIGN PATENT DOCUMENTS

EP  0717353 A2  6/1996
EP  0836145 A2  4/1998

(Continued)

OTHER PUBLICATIONS

Business Editors, "Sectorbase.com Launches Unique Internet Financial Destination," Business Wire, 4 pages, Jun. 2, 1999.

(Continued)

*Primary Examiner* — Oleg Survillo
(74) *Attorney, Agent, or Firm* — Perkins Coie LLP

(57) ABSTRACT

A real time information manager which processes raw data from data providers, such as feeds of current information about financial product offerings, is provided. Raw data objects received from various data providers are analyzed, formatted, and a current version of each unique data object is stored in an object storage pool. Information about the state of each objects is transmitted on a particular output data channel in accordance with the type of object. A subscriber process can access one or more of the data channels and utilize the broadcast data. In one configuration, one or more client managers are provided which subscribe to particular data channels and serve as an intermediary between the real time information manager and sets of clients.

20 Claims, 10 Drawing Sheets

(56) References Cited

U.S. PATENT DOCUMENTS

| | | | |
|---|---|---|---|
| 5,878,418 A | 3/1999 | Polcyn et al. | |
| 5,901,287 A | 5/1999 | Bull et al. | |
| 5,943,426 A | 8/1999 | Frith et al. | |
| 6,052,673 A | 4/2000 | Leon et al. | |
| 6,072,870 A * | 6/2000 | Nguyen et al. | 705/79 |
| 6,125,355 A | 9/2000 | Bekaert et al. | |
| 6,170,005 B1 | 1/2001 | Meandzija | |
| 6,230,205 B1 | 5/2001 | Garrity et al. | |
| 6,278,965 B1 | 8/2001 | Glass et al. | |
| 6,321,252 B1 | 11/2001 | Bhola et al. | |
| 6,480,940 B1 | 11/2002 | Aino | |
| 6,513,019 B2 * | 1/2003 | Lewis | 705/35 |
| 6,519,568 B1 | 2/2003 | Harvey et al. | |
| 6,546,421 B1 | 4/2003 | Wynblatt et al. | |
| 6,571,274 B1 | 5/2003 | Jacobs et al. | |
| 6,708,166 B1 | 3/2004 | Dysart et al. | |
| 6,708,213 B1 | 3/2004 | Bommaiah et al. | |
| 6,799,196 B1 | 9/2004 | Smith | |
| 6,839,680 B1 | 1/2005 | Liu et al. | |
| 6,847,971 B1 | 1/2005 | Balaraman et al. | |
| 7,003,504 B1 | 2/2006 | Angus et al. | |
| 7,069,234 B1 | 6/2006 | Cornelius et al. | |
| 7,107,240 B1 | 9/2006 | Silverman et al. | |
| 7,139,844 B2 * | 11/2006 | Smith et al. | 709/250 |
| 7,552,077 B1 | 6/2009 | Schluetter et al. | |
| 7,676,601 B2 * | 3/2010 | Smith et al. | 709/250 |
| 7,958,025 B2 * | 6/2011 | Smith et al. | 705/35 |
| 7,958,251 B2 * | 6/2011 | Smith et al. | 709/231 |
| 8,069,264 B2 * | 11/2011 | Smith et al. | 709/231 |
| 8,209,402 B1 * | 6/2012 | Smith et al. | 709/219 |
| 2002/0010789 A1 | 1/2002 | Lord | |
| 2002/0013853 A1 | 1/2002 | Baber et al. | |
| 2002/0042764 A1 | 4/2002 | Gardner et al. | |
| 2002/0046043 A1 | 4/2002 | Smith et al. | |
| 2002/0112056 A1 | 8/2002 | Baldwin et al. | |
| 2002/0138389 A1 | 9/2002 | Martone et al. | |
| 2003/0041161 A1 * | 2/2003 | Billings et al. | 709/231 |
| 2003/0115122 A1 | 6/2003 | Slater et al. | |
| 2004/0039671 A1 | 2/2004 | Smith et al. | |
| 2004/0107290 A1 | 6/2004 | Kaplan et al. | |
| 2004/0254921 A1 | 12/2004 | Cohen et al. | |
| 2005/0004978 A1 | 1/2005 | Reed et al. | |
| 2006/0053459 A1 * | 3/2006 | Simerly et al. | 725/105 |
| 2007/0073846 A1 | 3/2007 | Reisman | |
| 2007/0078978 A1 | 4/2007 | Arnold et al. | |
| 2007/0192474 A1 | 8/2007 | Decasper et al. | |
| 2008/0275998 A1 * | 11/2008 | Philyaw et al. | 709/231 |
| 2011/0041146 A1 * | 2/2011 | Lewis | 725/5 |
| 2011/0196839 A1 | 8/2011 | Smith et al. | |
| 2011/0231428 A1 | 9/2011 | Kuramura | |
| 2012/0016968 A1 * | 1/2012 | Smith et al. | 709/219 |

FOREIGN PATENT DOCUMENTS

| | | |
|---|---|---|
| WO | WO-00/02128 A1 | 1/2000 |
| WO | WO-00/45303 A1 | 8/2000 |

OTHER PUBLICATIONS

European Patent Application No. 01953601.0, Supplementary European Search Report, 3 pages, Mar. 6, 2008.
International Application No. PCT/US2001/023335, International Search Report, 5 pages, Oct. 11, 2001.
Reeves, Richard, "News-Tasters Filter Information, Reality," Sun Sentinel, 2 pages, Jul. 8, 1991.

* cited by examiner

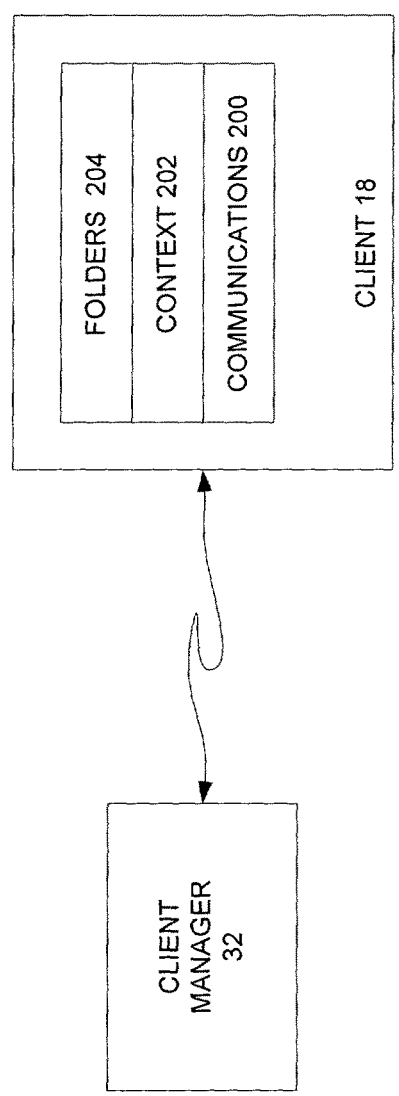

METHOD AND SYSTEM FOR PROCESSING RAW FINANCIAL DATA STREAMS TO PRODUCE AND DISTRIBUTE STRUCTURED AND VALIDATED PRODUCT OFFERING OBJECTS

CROSS-REFERENCE(S) TO RELATED APPLICATIONS:

This application is a continuation of and claims priority under 35 U.S.C. §120 to U.S. patent application Ser. No. 09/871,427 entitled "Method and System for Processing Raw Financial Data Streams to Produce and Distribute Structured and Validated Product Offering Objects" filed on May 21, 2001, which in turn claims the benefit of U.S. Provisional Application Ser. No. 60/223,397 filed on Aug. 4, 2000 and entitled "Real Time Host Infrastructure" and U.S. Provisional Application Ser. No. 60/227,162 filed on Aug. 22, 2000 and entitled "Enhanced Information Delivery." The entire contents of these applications are hereby incorporated by reference.

FIELD OF THE INVENTION

The present invention is related to a method and system for rendering and shaping an incoming content stream. More particularly, the present invention is related to a method and system for processing raw input data streams, such as data related to offerings from financial providers, and producing structured and validated output data which is suitable for distribution to clients.

BACKGROUND

Electronic distribution of financial product information from financial product originators to clients is a common service supplied by financial services providers. Typically, the service provider acts as a conduit for passing information related to various products between the financial content provider and clients. Such information includes new product offerings, updates to product attributes, such as a current price, and perhaps changes in the manner in which the product is classified.

It is not uncommon for a service provider to need to process dozens of data streams, each of which may be carrying information related to a large number of products. For example, a single data stream containing information about U.S. Treasuries typically contains data events related to several hundred different products.

There are various techniques for distributing raw financial services data to the clients. However, present techniques are labor or computationally expensive, treating the providers on an ad-hoc basis. In particular, in order to receive and process informational content so it can be distributed to downstream clients, the host needed to be hardwired to the specific structure and format of the incoming data stream. As a result, separate systems have developed for processing data from different sources. For example, one system may be dedicated to processing raw treasuries data and another independent system having its own structure may be dedicated to processing raw data related to corporate offerings. While acceptable for some operations, such ad-hoc techniques do not scale well and are difficult to integrate into a single comprehensive environment.

In addition, while present systems may be suitable for routing data from its source to various interested clients, conventional clients have been hard-wired to the host system with high-speed data connections. The proliferation of portable and wireless computer devices with low bandwidths and intermittent connectivity, along with the greater presence of smaller clients (both professional and individual) increases the need to provide a robust and adaptable data stream which is not susceptible to the inconsistencies inherent in communicating over a large communications network, such as the Internet.

Accordingly, it is an object of the present invention to provide an integrated infrastructure product which is designed to process real-time content streams from a host system such that it can be distributed to authorized subscribers.

It is a further object to a system configured to process multiple streams of raw data in real time and providing a formatted and validated output which is suitable for down stream processing and distribution to clients.

Yet another object of the present invention is to provide a system which is flexible and easily adapted to permit the management of multiple streams of data from various sources and allow new streams and product types to be easily added or modified.

Yet a further object of the present invention is to provide validated and formatted offer data in a format which minimizes the amount of data required to transmit the offer to downstream services.

Yet another object of the present invention is to provide a data delivery mechanism which dynamically adjusts transmission rates to the speed at which a client can receive and process data while ensuring that updated data received by a client is current.

SUMMARY OF THE INVENTION(S)

These and other objects are achieved in accordance with the present method and system for processing raw financial data streams to produce and distribute structured and validated product offering objects. The system is comprised of two major structural elements: a real time information manager and a client manager. The information manager is configured to process raw data streams from content providers and provide broadcasts of validated structured objects derived from the raw streams which represent the current state of the objects in substantially real-time.

In operation, the information manager receives raw data objects on at least one raw data stream input. The raw data objects are typed and validated and a corresponding formatted data object is generated. The current state of the object is stored in an object storage pool and also broadcast on a particular broadcast data stream, preferably selected from a number of available streams in accordance with the object type. In a preferred implementation, the current state is broadcast in differential form wherein the unique object at issue is identified and the changes in the object state relative to a prior state are provided. A preferred format for the storage of object typing and formatting rules is also disclosed.

The client manager is comprised of one or more object state managers which are connected to respective broadcast data streams and configured to maintain in an object cache the current state of objects as indicated on the various broadcast streams. Client sessions are provided to maintain communications with each respective client. When an object state manager detects that the state of an object carried on a particular broadcast data stream has changed, it directs an event to the client sessions for clients which have subscribed to that stream. The client event then evaluates filters and other rules specified in the client's profile to determine if the state change should be sent to the client and, if so, to forward the state change information for transmission to the client.

Preferably, each client has an associated delivery manager which maintains a queue of data to be sent to the particular client. Communication metrics, such as network transmission times and performance of the client's system, are monitored and the rate at which data is sent to the client is adjusted accordingly. In addition, aggregation functionality is preferably implemented such that when two or more state change events for a common data object are queued for transmission to a client, for example, changes in the price of a security, the various changes indicated to the object state are aggregated to produce a single event which includes all of the state changes which should be transmitted.

Advantageously, the architecture and operation of the present system is robust and can easily be adapted for a wide variety of systems and scales of operation. The modular nature of the system permits multiple information managers to be provided as required to process the various input data streams. The typing and formatting rules used by the information managers can easily be updated to accommodate new data providers and data types. Multiple client session managers can be provided to ensure sufficient capacity to support a large number of clients and can connect on demand to broadcast data streams from the various information managers. Moreover, the system can be implemented on a variety of platforms and the information managers and client managers can be local or remotely located relative to each other and to subscribing clients. In addition, the data output by the information managers is suitable for use by other applications and the client managers can be easily adapted for use with broadcast data streams provided by sources other than the information managers.

BRIEF DESCRIPTION OF THE FIGURES

The foregoing and other features of the present invention will be more readily apparent from the following detailed description and drawings of illustrative embodiments of the invention in which:

FIG. 10 is a high level diagram of the client system architecture.

DETAILED DESCRIPTION OF THE PREFERRED EMBODIMENTS

Figure 1:
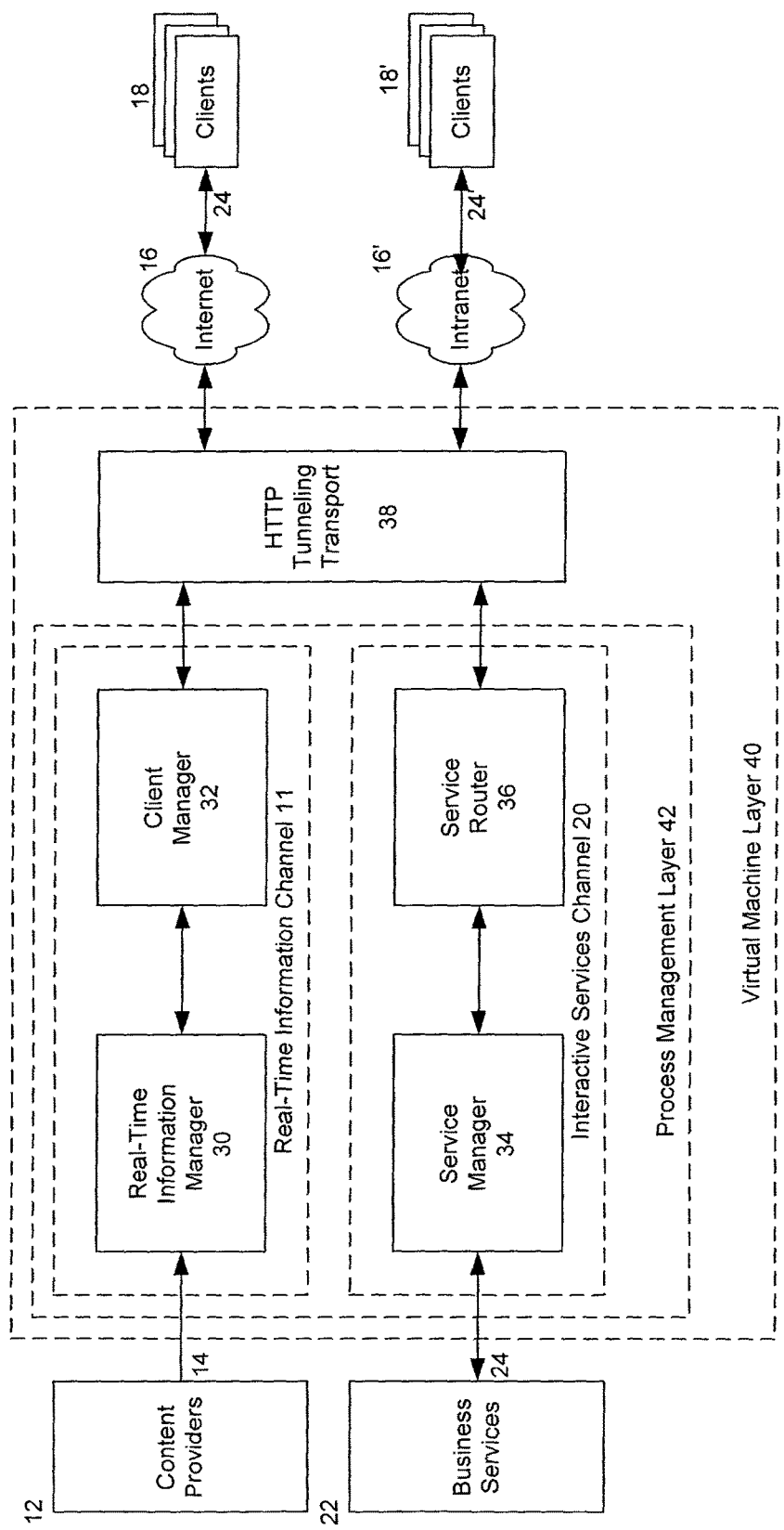
FIG. 1 is a block diagram of an integrated system for delivering real-time content streams to authorized subscribers and enabling real-time interactions between the host and subscriber and between businesses and customers over various networks.

Turning to FIG. 1 there is shown a high-level block diagram of an integrated system 10 for delivering real-time content streams to authorized subscribers and enabling real-time interactions between the host and subscriber and between businesses and customers over various networks. In particular, system 10 has a real-time information channel 11 which is configured to receive raw data streams 14 from one or more content providers 12, process the data streams in real time and then forward relevant offers and other data via a network 16 to subscribing clients 18.

The real-time information channel 11 is comprised of the real-time information manager 30 and the client manager 32. The real-time information manager 30 is configured to receive incoming streams of raw data 14, process the data, and then publish structured, validated content objects which can then be used by downstream processes. The client manager 32 is responsible for managing client custom profiles and implementing entitlement policy related to data types and services which can be used by the clients. The client manager 32 is also responsible for forwarding data to the clients and is preferably configured to dynamically adjust to changes in bandwidth and latency, as well as resource utilization on the client device to optimize delivery of content in real time and to maintain the client's connection to the host system. The real time information manager 30 and the client manager 32 are discussed in more detail below.

The system 10 can also include an interactive services channel 20 which facilitates the bi-directional flow of communications 24, 24' between host business services 22 and suscribing clients 18. The interactive services channel 20 is comprised of a service manager 34 and a service router 36. The service manager 34 is responsible for maintaining communication between various business services 22, such as trading, sales, and auctions and separate service managers may be used for various services. The service router 36 is configured to cache messages and track communications between the subscribing clients and businesses and the host system. The service router 36 also interacts with the service manager 34 which contains functionality to establish point-to-point connections between the client and individual business services. Network communications between the system 10 and clients 18 is preferably made using an HTTP tunneling transport system 38 which is configured to overcome limitations caused by the transient nature of HTTP and HTTPS protocols and provide a virtual persistent connection between the host system 10 and subscriber client 18. The tunneling transport system 38 is also discussed in more detail below.

System 10 is preferably implemented within the context of one or more Java Virtual Machines ("VM") which form a virtual machine layer 40. Over the VM layer 40 is the tunneling transport system 38 and a process management layer 42. The individual system processes, such as those forming the real time information channel 11 and the interactive services channel 20 operate in process management layer 42. The process layer 42 provides the ability to distribute, manage, and control multiple processes on the VM layer (which itself may span multiple machines). Other configurations and implementations are also possible.

Real-Time Information Manager

Figure 2:
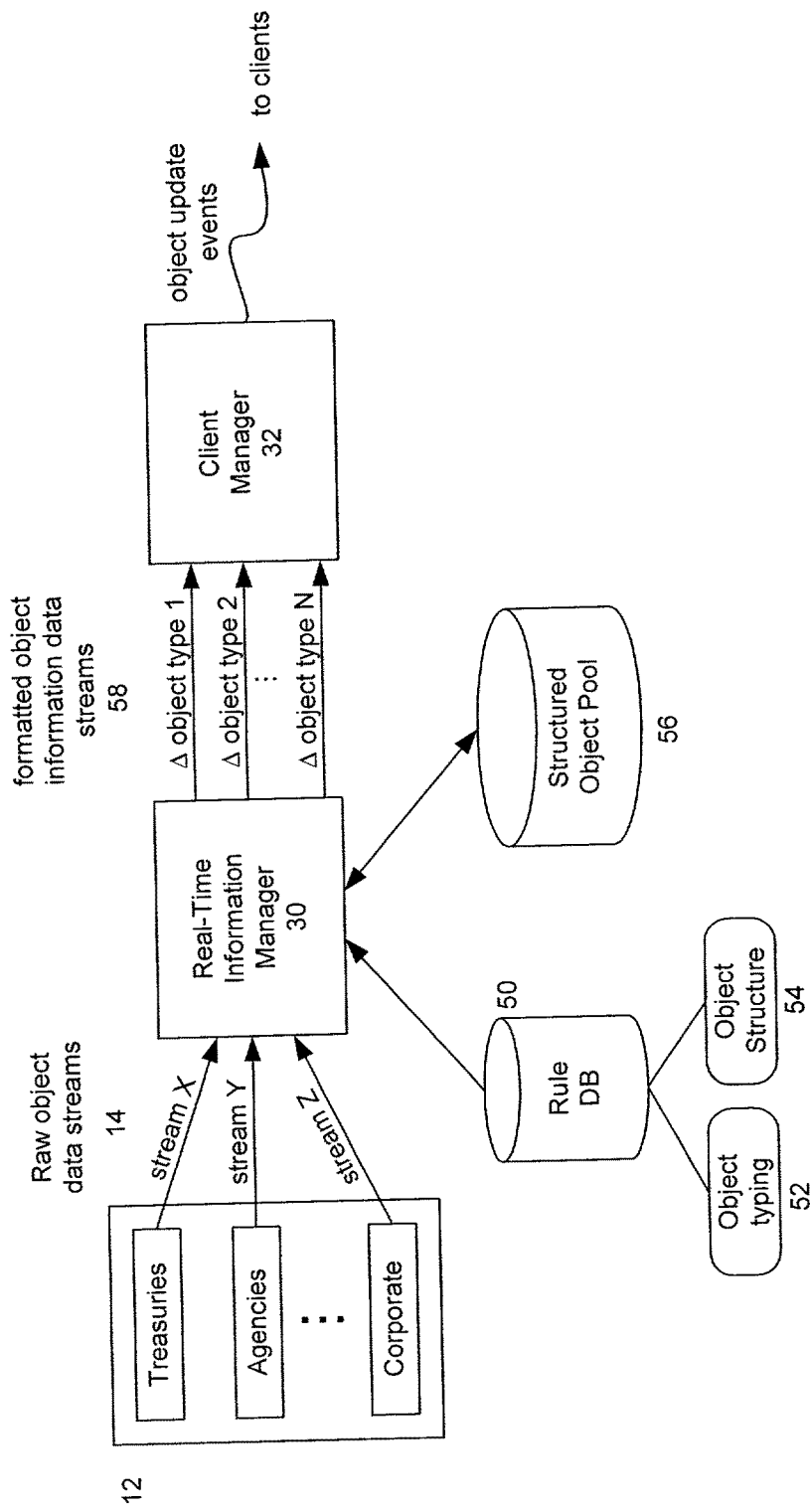
FIG. 2 is a high level diagram illustrating the operating environment of the real-time information manager of FIG. 1.

Turning to FIG. 2, there is shown a high level block diagram of the operation of the real-time information manager 30. The information manager 30 receives one or more raw object data streams 14 from various content providers 12. A variety of content providers can be supported and the data connection to each supporter can be implemented in a variety of ways known to those of skill in the art.

Preferably, the content providers supply raw data related to financial product offerings and such typical providers include treasuries, agencies and corporate entities. The raw object data streams 14 carry data objects containing information about various products or offerings. Each data object generally also contains a key which permits the object to be uniquely identified. Data included in a raw data stream can be different for different types of instruments. A treasuries stream, for example, can include descriptive details, pricing, volume or any other data related to government bonds, warrants, securities or other instruments that can be traded, sold, swapped or exchanged. Government bonds can include domestic, or foreign bonds, such as Japanese government bonds.

Alternative data streams can also be supported. Such streams preferably contain data objects related to information which can be monitored on a continuing basis, which is periodically updated, and where some or all of the updates should be communicated to one or more monitoring parties. In one alternative, the data streams include availability of various non-financial products or offerings, such as price and quantity of airline tickets, hotel rooms, and the like, and the processed data can be distributed to consumers and industry representatives, among others. Other alternative streams include electronic or on-line auctions, spot-market prices for various goods and services, measured status or performance of various systems. Various further data streams suitable for processing and distribution in accordance with the present system will be recognized by those of skill in the art.

The information manager 30 is configured to process the raw objects data stream and to identify the specific product type for each object. Generally, a rule database 50 is provided which includes object typing data 52 that defines the unique attributes associated with a given object. As an object is received by the information manager 30, the various rules are applied to determine the object type and verify the object, e.g., by making sure that its content complies with predefined criteria or limits. There are various techniques which can be used to identify and verify object types in a data stream which will known to those of skill in the art. A preferred technique which is well suited for processing multiple data streams containing perhaps hundreds of different objects and permitting easy creation and modification of object type signatures is discussed below.

After an object's type is identified and the object is verified, the object is formatted in accordance with various system requirements. The structure of the formatted object and various formatting rules 54 can be stored in the rule database 50. Formatting of a raw data object can include many actions, such as removing fields which are unimportant to downstream applications, adding additional data fields, such as the identified object type, adjusting the manner in which data fields are represented, etc.

According to a particular aspect of the invention, after an object is received, typed, and formatted appropriately, the formatted object is stored in a structured object pool 56, preferably in sets according to the object type. The object pool 56 can be considered a "master list" of the current state of all objects of each type which are carried by the input data streams. Objects can be uniquely identified by the key included in the raw data stream and preferably this key is used to store and access the objects in the pool 56. If a received object is not in the pool, a new entry is created in and the object is stored. In addition, the formatted object data is broadcast on a data stream 58. Preferably, separate data streams are provided for each unique type of object. The data streams 58 are received by downstream applications, and in particular, the client manager 32 which stores, processes, and forwards the object to clients as appropriate.

As will be appreciated, when there are a large number of data objects and types which are processed, the quantity of real-time data flowing from the information manager 30 to the client manager 32 can be very large. In order to reduce the quantity of data flow, and according to a further aspect of the invention, the formatted data object streams 58 typically contain differential offer data. In particular, when an object is received by the information manager 30, the object pool 56 is queried and, if an object having the same key is already present in the pool 56, the difference between the received object and the stored object is determined. Instead of broadcasting the complete formatted object to the client manager 32, only the differences are transmitted. This differential data can be used by downstream processes to modify prior versions of the object stored by those processes to reflect the updated information. The object stored in pool 56 is then updated to reflect the newly received object. Typically, only a small portion of the object data, such as the price, changes at a given time. As a result, the quantity of differential data which is broadcast is substantially smaller than the total object data without data loss.

Various techniques known to those of skill in the art can be used to determine the difference between a present and a prior data object. The particular method used is dependent on design and implementation issues. Such issues may include factors such as the format of database or storage system supporting pool 56, the structure of the offers stored in the pool, and the programming environment.

In the event that a received object is not present in the pool 56 but is instead a new offer, the entire object is broadcast. Similarly, when objects are classified and broadcast on data streams related to data type, if a received object has the same key as an object in the pool 56 but is of a different type, information manager 30 preferably deletes the old object in the pool 56 and stores the new object in accordance with its different type. The full object data is then broadcast on the data stream 58 appropriate for its new type. Also, a notice indicating the change in object type can be broadcast, particularly when the present stream is different from the stream which previously carried information about that object.

As will be appreciated, downstream processes which may be receiving the differential broadcast channels 58, such as client managers 32, will generally maintain copies of the current state of the various objects and update those copies in accordance with the differential data. In one embodiment, when the information manager 30 receives a request from such a process to subscribe to a data stream for a given object type, the information manager 30 can send a full copy of all objects of that type in the pool 56 (in their current state) to the subscriber. The subscriber can then store this "snapshot" of the objects of this type and subsequently revise the objects in accordance with received differential data.

In a more preferred embodiment, the information manager 30 can broadcast the various supported data streams without requiring specific knowledge of which particular systems are receiving the broadcast. In such a case, the information manager 30 can include functionality which will respond to requests for a snapshot of the current state of a particular object or set of objects and return the requested data on an appropriate data channel. This channel is preferably separate from the broadcast data channels. Alternatively, a data link can be provided between the client manager 32 (or other subscriber) and the structured object pool 56 to permit the client manager 32 to autonomously retrieve snapshot data "on demand", perhaps via an intermediate database access object (not shown), thus freeing the real-time information manager 30 from having to service subscription requests. The design selection of whether the client manager 32 is given direct access to the contents of the object pool 56 or accesses the object pool 56 via requests which are serviced by the information manager 30 or another module is dependant on system implementation details, such as the type of data links which can be established between the system elements, how tightly coupled the various elements are, the number and frequency of concurrent database connections which can be supported, and other factors which will be known to those of skill in the art.

While the snapshot data can be broadcast to the subscriber on the object data streams, this may result in a slowdown of the overall broadcast channel. Accordingly, the object type set snapshot is preferably transmitted on a separate channel. During the transit time, updates to the objects in the set may be received before the set has been fully processed by the subscriber. In this situation, a subsequent transmission can be sent to the subscriber. Alternatively, the subscriber can queue up differential updates received during the subscription process and apply them to the received snapshot data after it is available.

Figure 3:
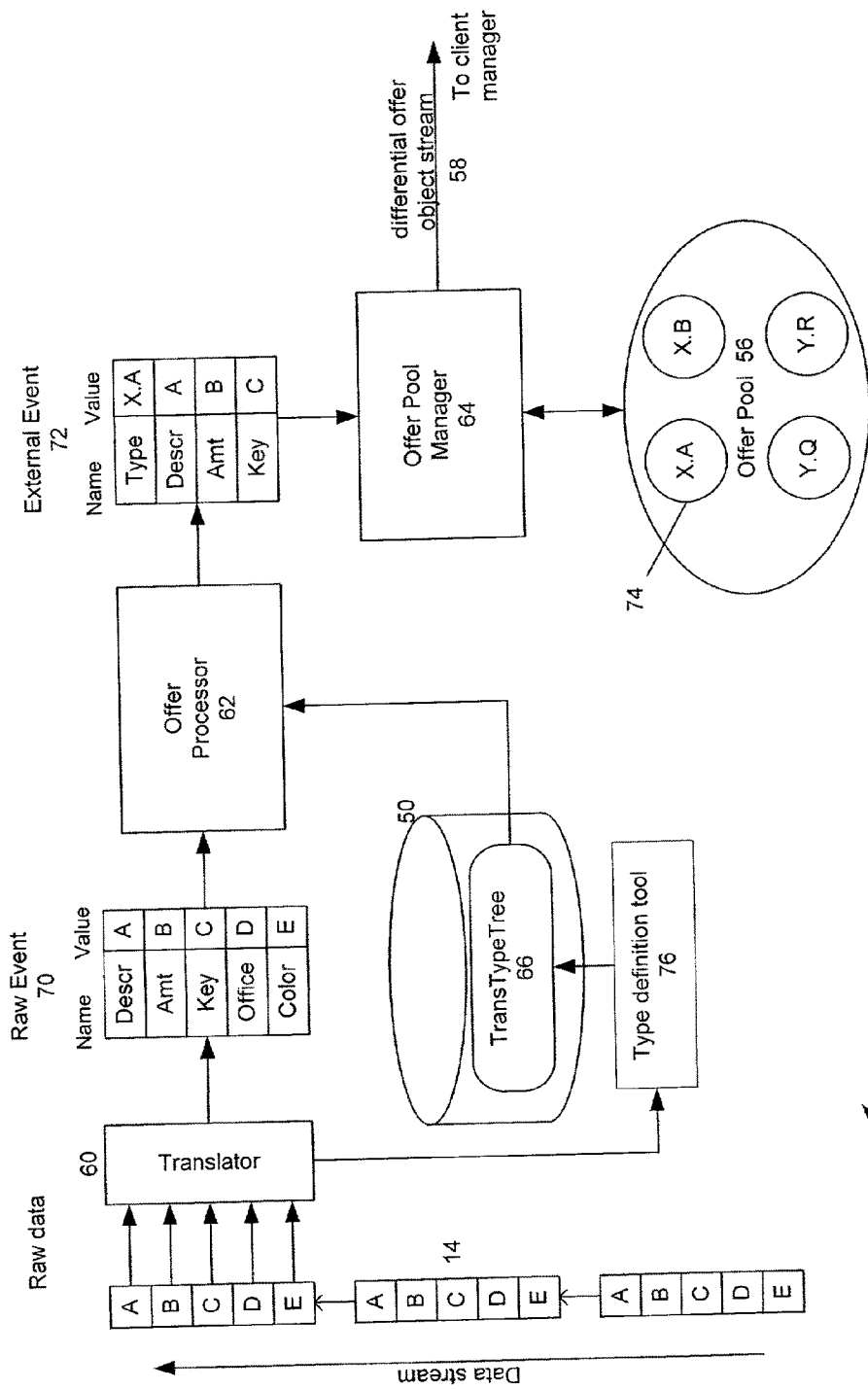
FIG. 3 shows a preferred architecture of the real-time information manager.

Turning to FIG. 3, there is shown a block diagram of a preferred architecture for real-time information manager 30. As shown, information manager comprises three primary modules—a translator 60, an offer processor 62, and an offer pool manager 64. The translator 60 receives a raw data stream 14 and generates raw events 70 comprising name-value pair sets. Preferably, the translator 60 is implemented as a Java class. Advantageously, this implementation substantially automates the extraction of the data attributes from the raw data stream and simplifies the identification of new data object types. This information can then be used to define the rules used to identify the new types.

The raw event 70 is then passed to the offer processor 62. The offer processor uses the rules in the rule database 50 to identify or type the raw event. Once the event type is determined, the appropriate validation, filtering, and enrichment rules for that type of event are retrieved. The rules are used to select relevant data attributes from the raw event, validate the correct product type, construct a product label, and filter events which should not be forwarded. The offer processor 62 then generates an external or processed event 72 which contains the attributes specified by the rules along with a product type identifier and a unique key derived from the possibly non-unique key in the raw data.

External events 72 are passed to the offer pool manager 64. The offer pool manager 64 is configured to automatically create a separate instance of the product type in the pool 56 for each separate instance of that particular type encountered in the raw data stream. The unique key derived from the raw data is used to link external events to offer instances in the offer pool 56. The Offer Pool contains the current state of all product offerings that have been broadcast to clients. If a new event contains updated information, the offer pool manager 64 identifies the change and, if the change is in a field used by downstream processes, broadcasts the changes. If the product offering (as represented by the external event) does not exist in the offer pool 56, the offer pool manager 64 adds the complete product offering to the pool 56 and also passes it in full to the to the client managers 32, either on the differential stream 58 or via a secondary data path configured for larger data transfers (not shown).

To aid downstream services in detecting when they have missed a differential update message, a sequence number is associated with each offer and subsequent update and the sequence number is broadcast with that update. When a product instance is added to the offer pool 56 for the first time it is assigned a sequence number of zero. Each time the instance of the offer in the pool 56 is updated by the offer pool manager 64 based on an external event, the sequence number is incremented by one. The sequence number is broadcast with differential update messages and can be used by the client managers 32 to verify that its local copy of the object is current. If a client manager 32 detects that the sequence number for an update message is not the next number in the sequence for the locally stored version of the associated object, one or more update messages have been missed and the client manager can request a full set of product type attributes to refresh the product offering image.

As discussed above, there are a variety of ways in which the rules for identifying type of raw events and processing it to generate an external event can be implemented. In a preferred implementation, the object typing system data 66 is organized in a tree-format, a simplified illustration of which is shown in FIG. 4.

Figure 4:
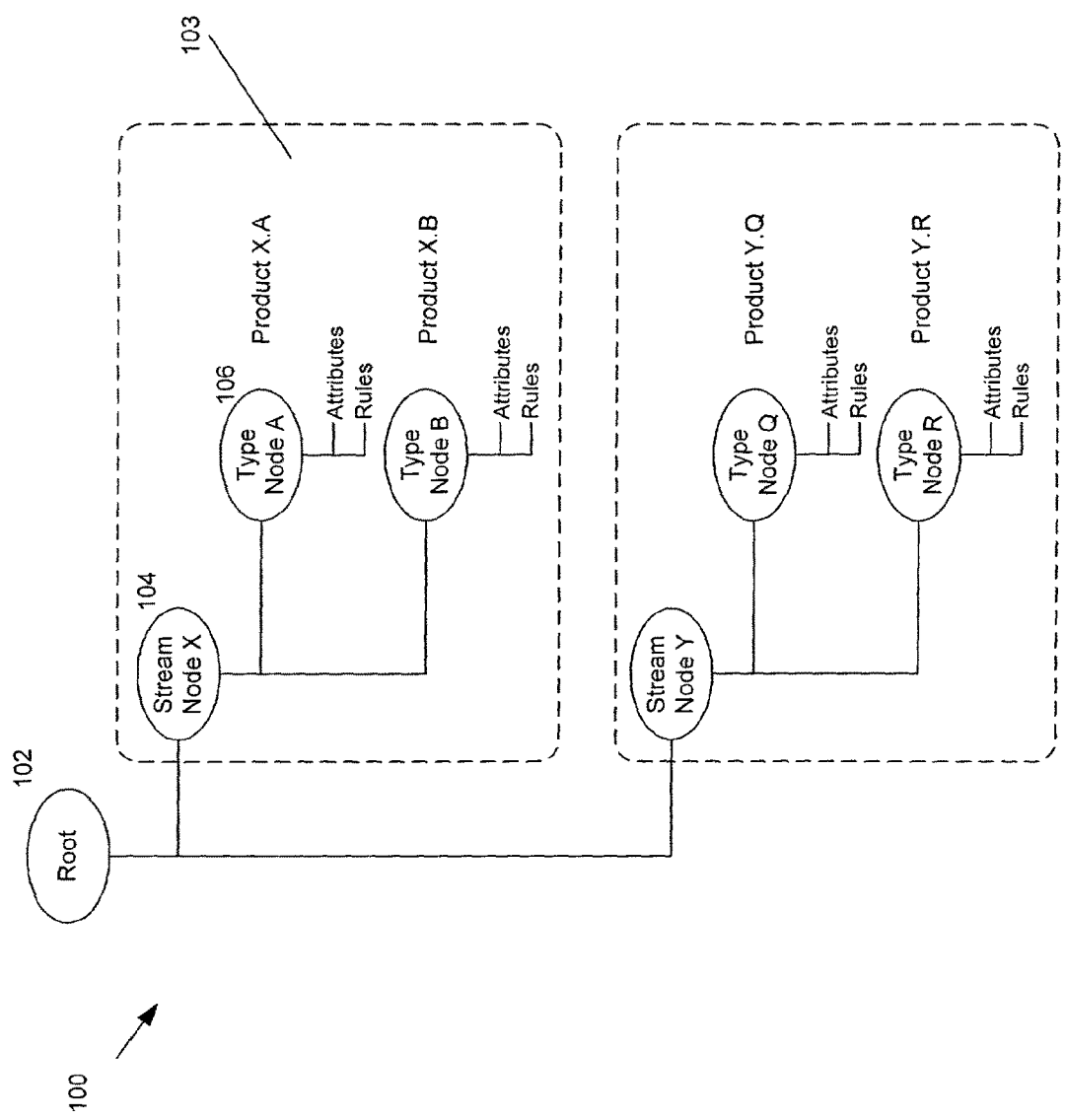
FIG. 4 is an illustration of a typing-tree used by the real-time information manager to process data input.

With reference to FIG. 4, a type tree 100 is provided which has a root node 102 to which at least one trans-type tree 103 is connected. The type tree 100 is a aggregation of all the type nodes and branch structures defined in the underlying trans-type trees 103. Each leaf node in the type tree defines a separate type and each type has a tree like structure defining the types attributes. The branch structure to the type nodes defines basis of information stream subscription and the content of the node defines the structure of the information stream.

More particularly, each trans-type tree 103 is associated with a specific raw data input stream and is connected to the root node 102 by an identifying stream node 104. Connected to each stream node 104 are at least one leaf node 106 which defines a specific type of object which can be carried on the respective data stream. The type leaf nodes 106 have embedded attributes which define the rules which are used for both typing and validation of raw events. (The attributes could also be attached as sub-nodes descending from the type leaf node.) The type nodes 106 also define the content structure of the type respective object type, such as filtering and enrichment rules used to generate corresponding external events. One or more levels of intermediate path nodes (not shown) can also be included between a stream node 104 and its typing leaf nodes 106 to help in organizing the various types in a stream. Although not required, intermediate nodes can also have associated typing rules used to distinguish the types of descendant leaf nodes from other types in the stream.

Preferably the specific typing rules are in the form of logical expressions which can be applied to the name-value pairs present in a raw event. These rules can be evaluated by traversing the nodes in the appropriate trans-type tree 103 and applying a suitable rule parsing engine. A "default" type can be applied for objects which do not match any of the types defined in a trans-type tree 103. The presence of such an unknown type can be used to trigger an alert message indicating that a new typing rule may need to be defined.

For example, the type tree 100 of FIG. 4 contains two trans-type trees, one associated with raw data stream X (as indicated by stream node X 104) and the other associated with raw data stream Y. Stream X has typing nodes for object types A and B which contain the rules for identifying these types as well as various attributes for processing the raw event. Stream Y has typing nodes containing rules to identify and process raw events of types Q and R. Product types can be uniquely identified by referencing the names of the stream and type nodes, for example type A products can be identified as product "X.A".

With reference to FIG. 3, the illustrated raw event 70 contains several name-value pairs, including "Descr=A". If this event were present on raw data stream X and node A defined a type according to the rule "Descr==A" then this raw event would be typed as product or offering type "X.A". Validation rules can also be applied. For example, one rule can specify that objects of type X.A must comply with the rule "Amt>0". If a type X.A object was received with Amt=0, for example, it would not be considered valid and appropriate action taken, such as blocking subsequent broadcast of the event and notifying the data provider. Attributes and formatting rules associated with node A specify the content of the resulting external event 72 and the manner in which the data is formatted. In this example, event 72 contains only the Descr, Amt, and Key name-value pairs. The values for "office" and "color" are omitted. The formatting rules also indicate the event is enriched by the addition of the "Type=X.A" name-value pair such that downstream processes do not need to redetermine the event type.

As will be appreciated, before a data stream can be processed by the system it must be declared to the typing system. In a preferred embodiment, the process of introducing the new stream is done through a specialized type definition tool or application 76 (see FIG. 3) which allows the streams to be defined, shaped and structured into types and allows typing and validation rules to be embedded, content and rule syntax to be checked and the TypeTree to be constructed. The preferred type-definition tool utilizes a graphical user interface which permits the user to indicate how incoming data will be interpreted via a software manipulation. In this way multiple data formats, wherein each data format relates to a distinct stream of raw data, can be received and processed.

Preferably, the translator 60 provides an output indicating the set of data-value pairs which are present in the various data objects contained in an input data stream and this output is provided to the type definition tool 76. The information provided by the translator 60 can then be used by the type definition tool 76 to permit an operator to easily identify and select from the various name-pairs from an undefined object in order to define an appropriate typing node with its associated typing and validation rules.

Figure 5:
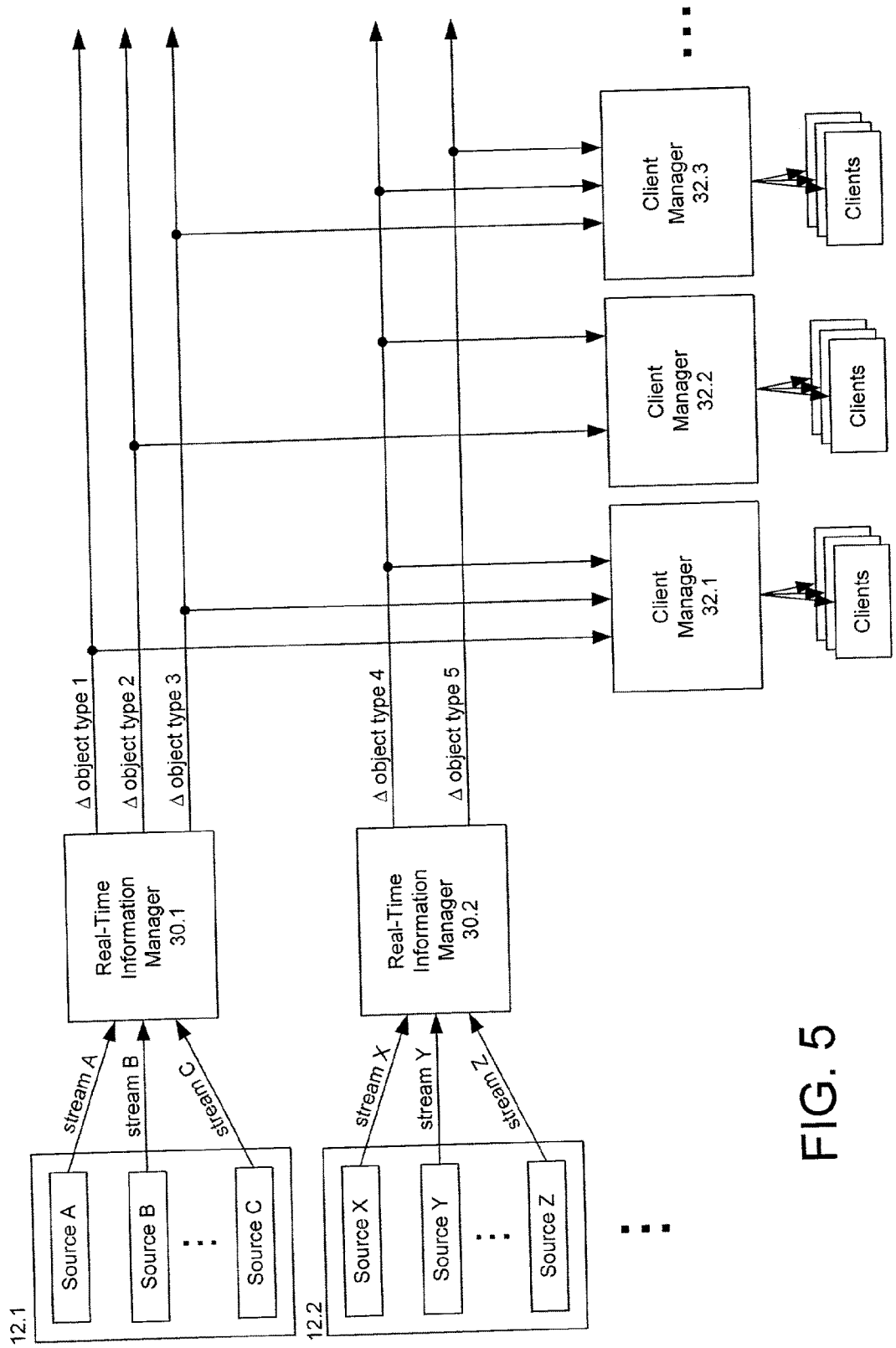
FIG. 5 is block diagram illustrating the scalability of the present real-time information architecture.

Advantageously, the present methods and system for a real-time information manager provides a robust data system which is easily scalable and customizable. A diagram showing such an embodiment and illustrating the flexibility and scalability of the present system is shown in FIG. 5 in which three client managers 32.1-32.3 are subscribed to various data stream broadcasts from two real-time information managers 30.1, 30.2. The subscribed data connections can be direct data connections, via an intervening network, such as an intranet or the Internet, or by other means known to those of skill in the art. Multiple instances of real-time information managers 30, running on the same or different platforms can be implemented as required to service a large number of high-bandwidth data streams. The organized nature of the output data streams permits connected client managers 32 to selectively receive data objects of a given type and the non-restrictive nature of the data broadcasts simplifies connecting multiple client managers 32 to the system and adding new client managers 32 to add capacity to support large number of clients.

Client Manager:

The Client Manager 32 (see FIG. 1) provides mechanism for mapping data streams, such as real-time information streams provided by the real time information manager 30, into customized, managed views of that data for a broad array of clients and devices. Acting as a local proxy for external sessions, the Client Manager 32 is configured to optimize the delivery of data by forwarding only the content that is necessary for a consistent view as subscribed by the client, at a rate that the remote connection and device can successfully support. In particular, the client manager 32 is configured to support three primary functions: (1) the creation and management of client sessions and their associated profiles, including references, permissions, views, subscriptions, and filters; (2) subscribe or connect on demand to content streams published by one or more real-time information management processors 30 and maintain a current state offer pool cache for the various offers on each subscribed stream, which pool is then used when delivering data to the set of subscribed client sessions; and (3) coordinate the delivery of subscribed content and associated real-time updates to various clients as appropriate.

The client manager 32 architecture can be used with multiple data sources. Preferably, however, the client manager receives differential data streams generated by the real time information manager 30 and has at least limited access to data stored at the information manager 30.

A client 18 can connect to the client manager 32 using a suitable network protocol, such as a Transmission Control Protocol/Internet Protocol (TCP/IP) socket. Preferably, clients connecting across the Internet via HTTP pass through the Enhanced Information Delivery HTTP tunneling transport layer 38 which provides a transparent protocol bridge between HTTP and the proxy socket protocol implemented in the client manager. The client manager 32 itself is generally unconcerned with how a session communication is maintained, such as on a local Intranet via a direct socket, or over the Internet via HTTP.

Figure 6:
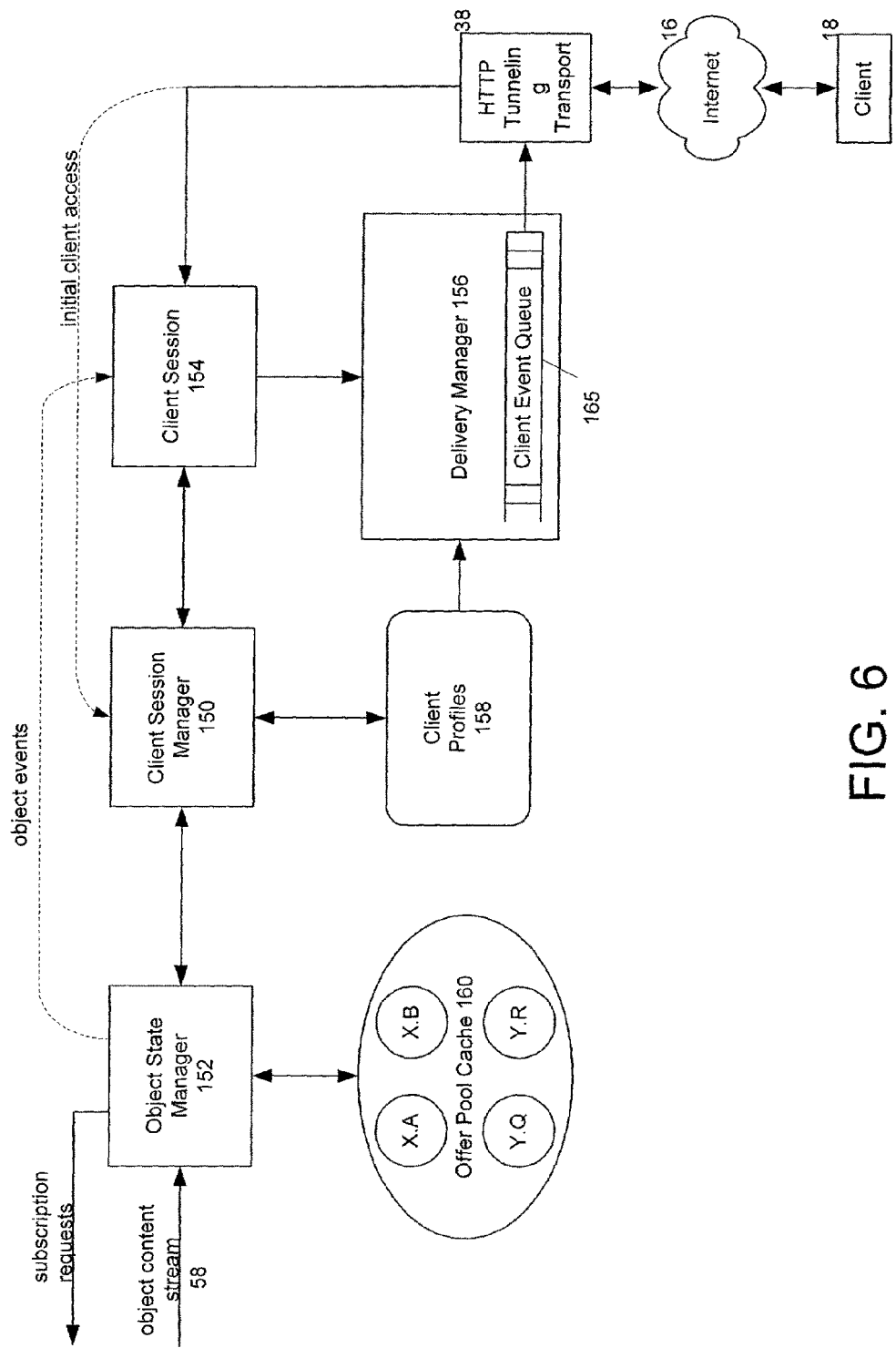
FIG. 6 shows a preferred architecture of the client manager.

Turning to FIG. 6, there is shown a preferred architecture of the client manager 32. The client manager 32 is comprised of a client session manager 150, at least one object state manager 152, and at least one client session 154. The client session manager 150 is configured to create and manage client sessions and associated client profiles 158. Upon first connecting to the client manager 32, a client will typically identify itself using a unique profile key (e.g. a user name). The client session manager 150 will either load a previously saved profile matching this key from a client profile repository 158, or create a new, empty profile for a new client to begin using. The client profile can be used to store a variety of data related to the object types or data streams which a particular client has subscribed as specific rules and filters to act on objects in a stream, referred generally and interchangeably to as object filtering rules, object evaluation rules, or just object rules. The profile is used to configure the operation of a client session 154 which is responsible for maintaining the communication link between the client 18 and the client manager 32 and also responsible for sending data objects and object updates to the client in accordance with the subscription selections and other profile data.

One or more object state managers 152 are configured to maintain a current state of objects in streams to which a client is subscribed and indicate when an object has changed state. The manner in which state changes are detected is dependent, at least in part, upon the format of the input data streams and whether it contains differential data events (as preferred), complete data sets, or intermediate formats.

In response to a state change in an object from a stream to which a client has subscribed, the client session 154 evaluates the change to determine if it is of a type which should be forwarded to the client. Preferably, evaluation rules, such as soft coded filters and custom programmed business logic, are maintained in the client's profile. If the filtering and evaluation rules indicate that the object is to be passed to the client, a suitable update action is passed to a delivery manager 156 where it is queued, if needed, and subsequently pushed to the client.

A variety of delivery techniques are available. Preferably, each client has its own dedicated delivery manager 156 which will maintain the respective client event queue 165 and push update events to the client at a suitable rate, adjusting the rate as needed to compensate for, e.g., available bandwidth, network delays, and client response time. As a result, the delivery of real-time data is optimized by forwarding only the content that is necessary for a consistent view of the object pool as subscribed by the client, at a rate that the remote connection and device can successfully support.

As discussed above, the object state manager 152 is configured to receive object content data from an upstream source, preferably the real time information manager 30, and to maintain a copy of the current state of all objects carried by the stream, e.g., in an offer pool cache 160. In addition, the object state manager 152 is further configured to detect changes to objects in the offer pool cache 160 and publish events or notifications which indicate that clients monitoring this object (or object type) may require updating so that the appropriate client session 154 can take action.

When a client session 154 is established for a client, the client session manager 150 ensures that an object state manager 152 is connected to the data streams to which the client has subscribed, e.g., as reflected in the client profile. The client manager 32 subscribes to streams on demand in accordance with an aggregation of subscriptions in the client profiles in each active client session. When a client session requires access to a content stream which is not currently being monitored, the client session manager 150 initiates a subscription to that stream by an appropriate object state manager 152.

When a new content stream subscription is initiated, the object state manager 152 issues a request to retrieve the initial stream state from the repository/database at the stream's source and uses this information to initialize the respective offer pool cache 160. The object state manager 152 also establishes an appropriate communication link to receive the data on the content stream 58 and begins to monitor the state of the objects on the incoming stream. Preferably, the content stream subscribed to by the client manager consists of a sequence of events.

A snapshot of object states is initially delivered or otherwise obtained and changes to the states, such as adds, deletes, and updates, are subsequently received. Changes to objects in the stream are published to the client sessions that have registered interest. Preferably streams to which no interest has been registered for a predetermined period of time, such as 2 to 3 days, are purged.

Figure 7:
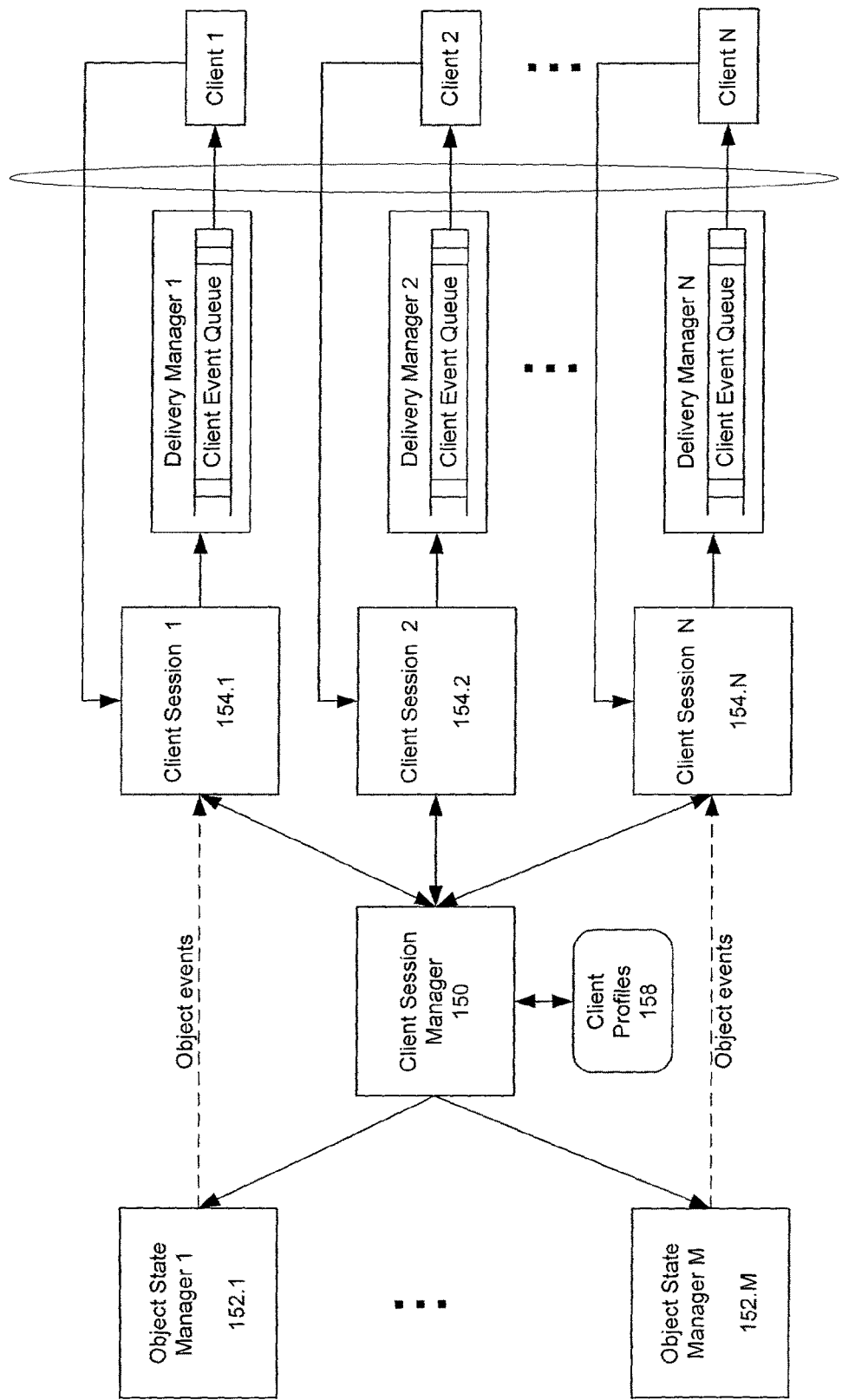
FIG. 7 is a block diagram illustrating the client manager of FIG. 6 supporting multiple client sessions.

Although a single object state manager 152 and associated offer pool cache 160 can be established to monitor and maintain the status of objects on all subscribed streams, preferably multiple object state managers 152 are supported, wherein each monitors a single respective input stream. Similarly, each client preferably has its own dedicated client session and associated delivery manager. As a result, the client manager 32 can have multiple client sessions and multiple object state managers all operating concurrently. Such a multi-threaded environment is illustrated in FIG. 7. As will be appreciated, the number of concurrent object state managers 152 and client sessions 154 is limited only by the speed and resources of the hosting machine. Multiple Client Manager processes can be run across a farm of machines to support a highly scaleable environment supporting potentially any number of clients.

Figure 8:
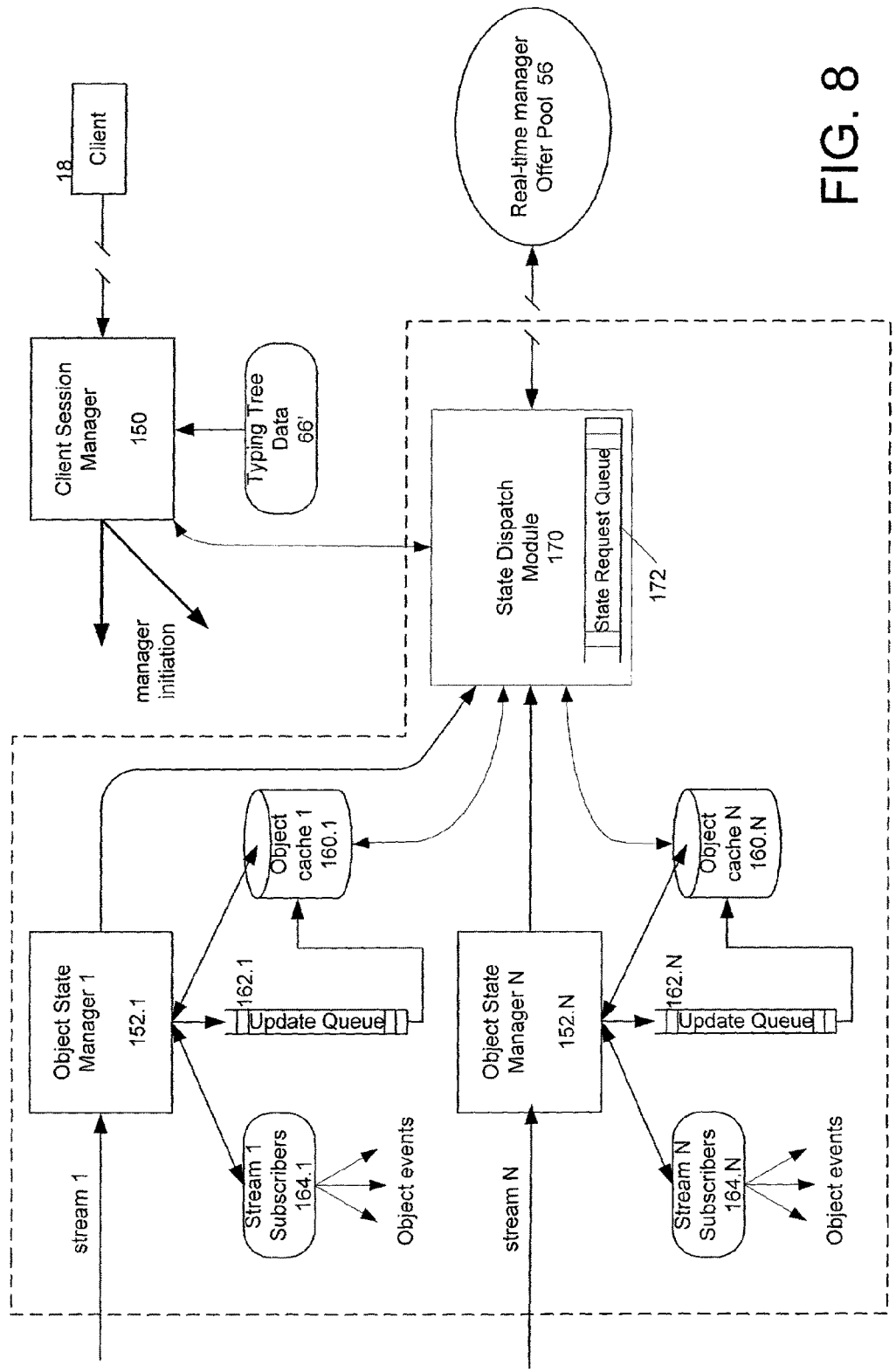
FIG. 8 is a block diagram illustrating a preferred structure of the object state manager of FIG. 6.

Turning to FIG. 8, there is shown a preferred implementation of the object state manager 152. Each object state manager 152 has an associated object event cache 160 and a table 164 which indicates those processes which should receive notice of changes to objects carried by the monitored stream. Generally, such processes are the various client sessions. However, events can be issued to other processes as well.

When a first request is made to subscribe to a data stream, the client session manager 150 starts an instance of an object state manager 152 to monitor that stream. Clients are preferably given information which indicates all streams to which they can subscribe (subject to usage constraints, e.g., as per information in the client profile or elsewhere). This information can easily be determined by the client session manager 150 by extracting the type leaf nodes from the typing tree data present on connected real-time managers 30. (See FIGS. 3-4). Copies 66' of the typing trees 66 can be maintained at the client manager 32 to simplify access to this data.

When an object state manager 152 is first started, a snapshot of the current state of the objects carried on the data stream to be monitored is obtained and used to initialize the respective object cache 160. To aid in this process, a state dispatch module 170 is provided to coordinate access by the various object state managers 152.1-152.N to an object data source database, such as the offer pool 56 maintained by the real-time information manager 30.

Upon receiving a request from an object state manager 152, the state dispatch module 170 obtains the appropriate object data from the offer pool 56 in the respective real-time information manager 30. This data is then used to initialize the object cache 160 for the requesting object state manager 152 and the object state manager is informed of the result. A state request queue 172 can be provided to permit multiple requests to be issued to the state dispatch module 170, each of which can be processed in turn as resources become available.

A variety of techniques can be employed to obtain object data from the offer pool 56. In a preferred implementation, the offer pool 56 is implemented in a manner which permits direct access to the stored object data by the state dispatch module. Other techniques for retrieving the object data can also be used, the suitability of which depends upon the available communication channels and database technology used in implementing the system.

In order to provide for reasonable throughput while also limiting the number of concurrent accesses by the state dispatch module 170, preferably a data access thread pool is provided (not shown), wherein each thread in the pool is configured to service a data request by an object state manager. As a thread becomes available, it processes the next request on the request queue 172.

After the object cache 160 is initialized, the object state manager 152 begins monitoring the respective data stream. Incoming data is preferably in differential form and, upon receiving a data object on the stream, the unique object key is used to update the corresponding object in the object cache 160 as indicated. (For non-differential data, the object state manager can further include functionality to determine if a received object differs from a cached version and then possibly determine if the type of change is one which requires subsequent action). When an object update is detected, such as when a differential object is received on the stream, an object event is issued and directed to all subscribing clients as indicated in the subscriber list 164. The purpose of the object event is to inform the various client sessions that some sort of change has occurred with regard to a specific data object so that a determination can be made whether to forward this change to the client. The object event can contain the entire object itself, a pointer to the object (e.g., in the offer pool cache), a representation of what aspects of the object have changed, or a pointer to this information.

An update queue 162 can further be provided for each object state manager 152 to temporarily store objects received on the stream until they can be acted upon. Preferably, the update queue 162 is also used to store objects received on the data stream during the period between requesting a snapshot of the offer pool and subsequent cache initialization. After the cache is initialized, the contents of the queue are applied to the cache.

Generally, a stream will only be monitored when a client session subscribed to that stream is active (or for limited period of time after a state when no clients are subscribing is entered). However, there may be circumstances when it would be advantageous to continually monitor one or more selected streams, even in the absence of subscribing clients, in order to be able to more quickly provide the object state information to a client.

Figure 9:
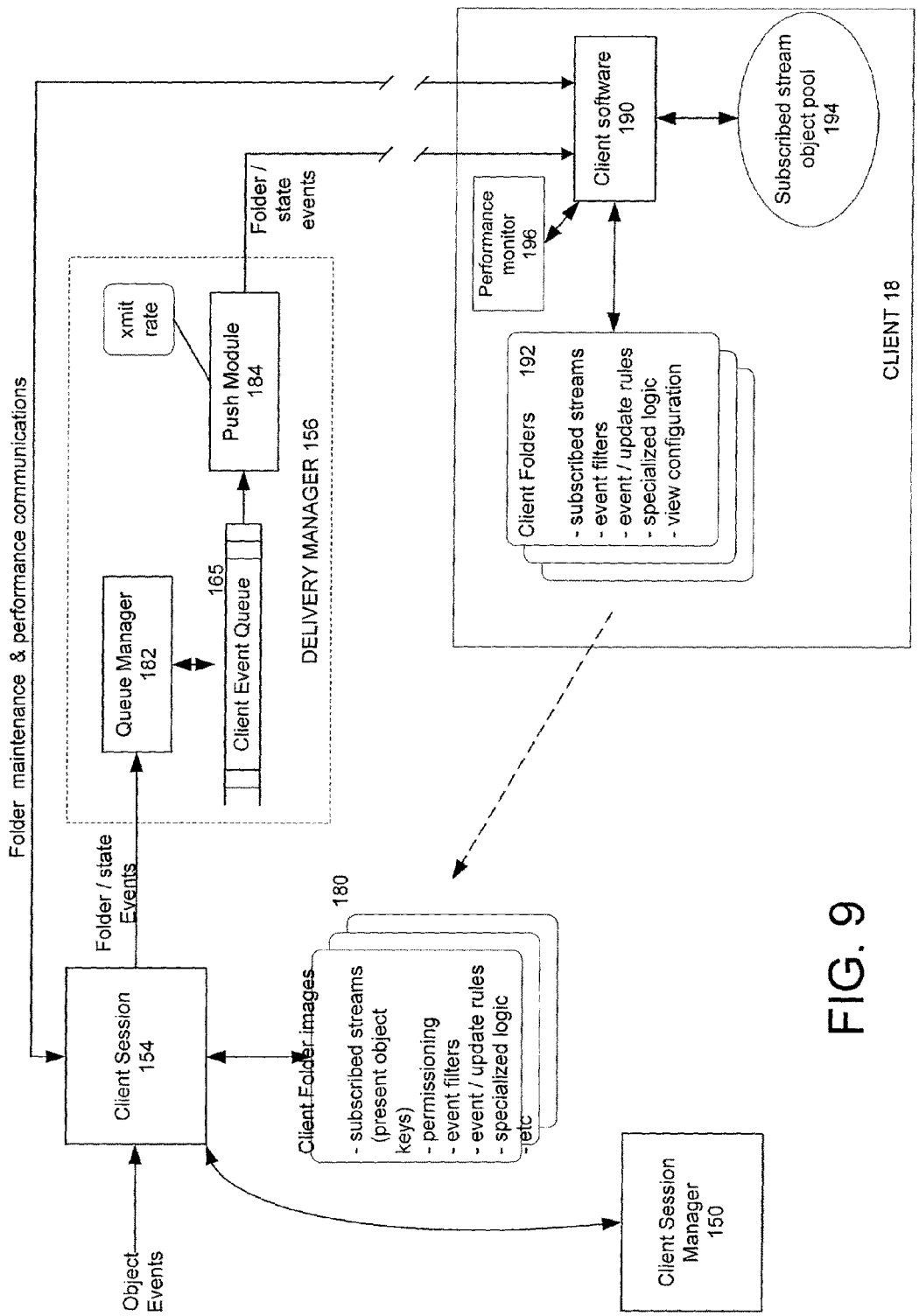
FIG. 9 is a block diagram illustrating the client session and delivery manager of FIG. 6 and further showing a high-level view of the client-side system elements.

Turning to FIG. 9, there is shown a block diagram illustrating the client session 154 and a preferred implementation of the delivery manager 156 of FIG. 6 and further showing a high-level view of the system residing on the client 18. Prior to a further discussion of the operation of the client session 154 and delivery manager 156, it is beneficial to briefly discuss the architecture and operation of a preferred embodiment of the client system 18.

In a preferred embodiment, the software 190 operating on the client 18 maintains a copy of the current state of the various objects of interest to the client in the data streams to which the client has subscribed. The object state is preferably contained in a subscribed stream object pool 194 present on the client system. Similar to the operation of the object state manager 152, when a client first subscribes to a data stream, a snapshot of the objects in that data stream is retrieved, constrained by any filters, rules, or other logic which may be in place, delivered to the client 18, and stored in the client's object pool 194. In a preferred implementation, the state dispatch module 170 (see FIG. 8) is configured to process such data requests from the client session manager 150 or from the various client sessions 154. Because all data streams which have at least one subscribing client should have an associated object state manager 152 which maintains the current state of objects in the stream, the state dispatch module 170 can retrieve the requested information directly from the various object caches 160 and return the data to the client via the client session manager 150 and/or the dedicated client session 154. Once the initial object snapshots have been retrieved, the client software 190 then modifies the objects and associated data in accordance with events received at the client from the client manager 32.

A variety of techniques can be used to organize the objects on the client system and to specify (in the user's profile) which objects are to be delivered to a given client, how they are to be organized and viewed by the client, as well as other functionality. A client's user profile will generally specify the data stream subscriptions and define preferences regarding how the objects in those streams are filtered, manipulated, and displayed on the client system 18. Preferably, this information is organized according to a folder paradigm in which the client profile includes one or more folders, each of which comprises a set of attributes that describe the folder's data content, how to manipulate it, and how to visually represent it.

In a most preferred embodiment, the folder contains the following attributes:

(a) Configuration & Initialization data which defines Java classes that represent the folder on both the client and server side and can further define an optional parent relationship for inheritance of attributes.

(b) Subscriptions to one or more content streams from which the folder will receive real-time data.

(c) Content constraints and/or filters which constrain and filter the objects from the data stream according to, e.g., type, name, application of logical rules specified in a suitable rules based language.

(d) Permissions which restriction user access to a folder or specific folder related functionality (e.g. on-line trading).

(d) Display attributes, such as formatting rules which specify how the data should be displayed, sorting rules indicating an order of display, and various miscellaneous visual characteristics including font, size, and color.

Preferably, the defining attributes of the various client folders are saved as part of the client profile 158 at the client manager 32 so as to persist across multiple sessions for a given client concurrently or over time. Thus, as shown in FIG. 9, the client manager 32 will have folder images 180 which generally correspond to the various folders 192 defined by the client. It should be noted that the images 180 need not be exact duplicates of the client folders 192 and either set may contain additional data as appropriate for the implementation conditions. Broadly, the client-side functionality is directed to presentation and display of various objects and data while the client-manager functionality is directed to evaluation data and rules used to determine what data should be provided to the client. As a result, while the client-side folder 192 can contain copies of the current filters and constraints in effect at the client so that the client can view, edit, and create new rules, such rules are typically not executed by the client. Therefore, the form in which they are stored and presented at the client can differ from the executable version present in the client-manager version 180.

When a client "opens" a folder 192, the client software 190 acts on the subscriptions and filters which define the folder and its contents and creates a display of discrete content items, extracting specific object data from the object pool 194. Although the object data can be considered as being contained in the user's folder, the same object may appear in multiple folders, possibly displayed in different ways or under different conditions. Preferably, the objects contained in a given folder are identified in accordance with the object key, which key can then be used to retrieve the actual object data from the object pool 194 as necessary when that object is displayed In addition to various organizational and display specifications, the user profile or folders can contain defined rules which places constraints and filters that define which objects in a subscribed data stream are passed to the client and under what conditions, and how and where the objects should be displayed. For example, a client subscribing to a stream which contained all stocks listed on the American Stock Exchange ("AMEX") can define a filter to specified that only objects relating to stocks in a particular category, such as "technology companies" be delivered. The client can further define a set of constraints which specify, for example, that an object should be displayed in a first folder when its trading volume is above a specified amount and only appear in a second folder when its price has changed by more than a specified amount in a given time period. Rules can be described using a rule-based language, by selecting predefined sets, or by other means known to those of skill in the art.

In a preferred implementation, more sophisticated processing of object events is provided by allowing client manager folder plug-ins to be developed and deployed within the client manager. Plug-in class objects in the client profile can implement specialized logic and filtering on the subscribed content streams and associated events before they are pushed downstream to the client in accordance with conditions or states which are not easily represented using simplified rule languages. On the client-side application, a corresponding subclass can be provided to implement any specialization with regard to data manipulation and visual representation of the subscribed streams.

Advantageously, the server-side folder plug-in, and the client-side plug-in can work in tandem to provide the user with a broad range of business specific presentation and functionality. For example, a plug-in can be defined for an "Approved Issuer List in Money Market Trading" and which includes special business logic to remove any information that is not associated with a user-defined list of issuers. Similarly, a plug-in can be employed to allow a user to build folders with specific treasury securities of interest.

When an object event is received by the client session 154, the client session executes the various rules and plug-ins which apply to the data stream associated with the object, e.g., by identifying the client folders which contain subscriptions to the associated data stream and then executing the relevant rules contained in those folders. The executed rules will generally produce a set of potential responses, including state events which specify if the object should be added to, deleted from, or updated in the client's subscribed object pool 194 and folder events which specify whether, for example, the object should be added to or removed from a specific folder. (Executing rules can also indicate that no action need be taken).

The client session then aggregates and combines the various events generated by the rule execution to produce a state change event for object, if needed, along with a series of related folder actions tied to individual folders and associated with the state event. For example, an object event indicating that the price of a specific object has increased could result in an update event for the object, an add event for one folder, and a delete event for a second folder. The aggregated events are then sent to the delivery manager 156, preferably combined into a single encapsulated event object having an associated ID which indicates the data object to which it relates.

In its simplest form, the delivery manager 156 comprises a client event queue 165 into which a received object is placed and a push thread 184 which is configured to extract objects from the event queue 165 and deliver the related data to the client 18. Preferably, however, the delivery manager 156 includes a queue manager 182 which is configured to aggregate events in the queue which relate to the same object and the push module 184 is configured to vary the rate at which data is delivered to the client in response to measurements of the round-trip network travel time and the time it takes the client to respond.

In the preferred implementation, when the queue manager 182 receives an event, it determines whether there is an event already present in the queue related to the object associated with the newly received event. If so, a process is initiated whereby the queued and newly received events (in the aggregate event object) are analyzed to combine or eliminate events and thereby reduce the amount of data which is ultimately delivered to the client. This functionality can be implemented wholly in the queue manager 182. Preferably, however, received event objects contain embedded functions which encompass a basic set of aggregation and combination rules for folder and state events. These functions tell the event objects how to aggregate with other events in the queue that relate to the same data object.

Upon receiving an event, such as an aggregated event comprising a state event and possibly one or more folder events, the queue manager 182 first performs a state event aggregation, e.g., by running the state aggregation function in the received state event, if present. Folder event aggregation functionality can then be executed as appropriate.

There are three primary conditions which can occur when a state event is received (other than when there is no previously queued event for the corresponding object). One condition is where an object update event is received and an update or add event is already queued for the same object. When this situation occurs, the data changes reflected in the received update event are applied to the data in the already queued object update or add event. Folder events associated with the new update event are combined with those associated with the queued event to update, add, or remove folder events as appropriate. The received update event, after being integrated with the pending events, can then be discarded.

A second condition is when an object delete event is received and an update or add event is already queued for the same object. In this situation, the new delete event effectively nullifies the prior queued update or add event. The queued state event and any related folder add events are removed from the queue and the delete event is placed in the queue.

A third condition is when an object add event is received and a delete event for that object is already queued. Because the delete event has not yet been sent to the client, the object still exists in the clients object pool and adding the object on the client can result in conflicts with the data already present. Accordingly, the add event is converted into an "update" event which contains the data attributes for the data object specified in the add event.

Advantageously, by continually executing aggregation procedures of this type on a pending event queue, duplicate data and unnecessary data transmissions are culled from the queue. This reduces the total amount of data which must be sent to the client while still ensuring that when data is received at the client, it reflects the current object state. Further, the aggregation scheme also limits the total length of the queue since, in a worst case scenario, there will be at most one queued state event for each current object type.

Events transmitted to a client generally represent the same object data as the events generated by the client session and queued by the delivery manager (such as add, change, or delete indications for a given object), and thus are referred to herein by similar designations for convenience. While events broadcast to a client are derived from events received at a client session and/or delivery manager, the format and configuration of events broadcast to a client can differ from internal events. For example, secondary aspects of the events received by the delivery manager, such as aggregation functionality, need not be forwarded to the client. Similarly, the client must receive the actual data changes for the event while an internal event can contain a pointer to data stored elsewhere. The derivation of a client event from a state event can occur at any appropriate point, such as when the event is placed in the client event queue or when it is removed from the queue and prepared for transmission. In addition, a "derived" client event can be the same as the source state event if appropriate for the particular implementation.

In addition to aggregating client events, the rate at which events are delivered to a client from the delivery manager 156 is preferably optimized to reflect network and response delays. Clients connected to the client manager 32 can have widely differing capabilities with regards to remote machine resources (e.g., CPU and memory), network bandwidth, and latency. A client could potentially be running on a high powered workstation with a huge network pipe, or a handheld device with a slow wireless connection. Without requiring knowledge of the specifics of the device and network available to a client session, data metrics are be continually gathered and monitored by the client session 154 and used to determine suitable delivery constraints.

Metrics specific to the available client resources are collected dynamically for the life of each client session. Because the optimization is on a per-client basis, the system can support widely varying delivery requirements for the many different devices and connectivity options and does not require that the client specify their connection bandwidth or hardware capabilities.

In a specific implementation, the network travel time and client event processing speed are measured. The delivery manager 156 can measure the network travel time using a variety of techniques, such as measuring the delay between when data is pushed to the client and an HTTP acknowledge is received indicating that the data has arrived. Alternatively, the client session 154 can periodically issue a test message to the client and measure the period of time before a response from the client is received. To determine the amount of time it takes for an event to be fully realized by the client (e.g. an update event shown on the user's screen), a performance monitor 196 can be implemented on the client 18 which monitors the client performance and periodically or on request forwards the performance data to the client session 154.

The performance data is analyzed to determine a cycle period based on the network travel time, and the theoretical maximum number of events the client can successfully handle during this cycle period (based on the event processing speed). These constraints will then be applied to the push thread which adjusts the rate of transmission and number of outstanding data messages accordingly. Over time, the metrics can change and the constraints are adjusted accordingly.

Because each client has a dedicated delivery manager thread 156 executing in the client manager 32 which examines these metrics and dynamically adjusts the flow of events downstream, efficient delivery given the resources available to the client can be consistently achieved. Advantageously, this adaptive data streaming works in conjunction with event aggregation processes to ensure that events are not delivered too quickly downstream for the client to process while also ensuring that events which are delivered reflect the current state of the object. As a result, while the time period between data updates at the client can vary, when an update is received, the effective real-time status of the data (at the time of the update) is maintained.

Client System:

The client system 18 can be structured in a variety of ways. In a preferred embodiment, and as shown in FIG. 10, the client system preferably is comprised of three layers of functionality: communications 200, context 202, and folders 204. The communications layer 200 is configured to manage the connection between the client 18 and the client manager 32. In a particular implementation, communication is achieved using either HTTP Tunneling Transport (for Internet connections) or sockets (for intranet connections).

The context layer 202 is configured to send and receive events and messages to and from the Client Manager 32. The context functions as the central distribution point of events and messages to the folder layer 204. The folders layer 204 comprises logical groupings of information and discrete sets of related content within an information stream. As discussed above with respect to the client folders 192 shown in FIG. 9, A folder represents subscriptions to one or more information streams, where each subscription maps to one of the streams typed and published by the Real-time Information Manager 30 and made available through the Client Manager 32. Subscriptions and filters define the specific content of a folder.

Preferably, the client output is rendered in a graphical column-and-row (spreadsheet) format. However, alternative formats can also employed as appropriate. For example, a process could use a client API to establish a server process within a network, subscribing to content and taking requests on the server side and render content as HTML pages. The point is that the client should be rendered in a form that is appropriate to support of the host services and information streams. Advantageously, the client manager 32 is generally unconcerned with the manner in which a client acts on received object data and, as result, a wide variety of client formats can be implemented and supported by the present methodology.

HTTP Tunneling Transport:

Various communication techniques, interfaces, and protocols can be used to connect a client manager 32 with a client. In a preferred implementation, and as shown in, e.g., FIG. 1, an HTTP tunneling transport layer 38 is provided to support a virtual persistent connection using the HTTP tunneling transport. When a client issues a valid request for access to the system, a unique secure session key is assigned and used to bind the client to a particular service for the life of its session.

The initial HTTP request channel can be held open and becomes the 'push' or 'publish' channel (thus appearing to all hops in the connection's path as a potentially very long HTTP response). Since this connection stays open, it can be used as a path to publish content in real-time to the client. To do this efficiently and reliably for a given stream, each event from the service is preferably sequenced, queued, encoded, transmitted, and stored (in case a retransmission is required due to connectivity problems).

Heartbeat messages can also be sent to the client on at periodic intervals to ensure that the given channel remains valid. If a problem is detected, transmission of events can be suspended and the client given a period of time to re-establish connectivity to the session, recover, and resume normal operation. If a pattern of disconnections emerges (as for example, may occur when a client's firewall proxy limits connections to no more 3 minutes), the timing parameters for the client's session are adjusted in an attempt to avoid problems in the future, e.g., by closing a current channel and opening a new one before interference by the firewall. In particular, given dynamic timing parameters, the system can proactively request that the client periodically cycle the existing 'push' channel to a new HTTP connection—to avoid any problems before they could happen. The client and transport system 38 preferably carry out this process asynchronously and transparently, so as not to disturb the consistent flow of real-time data to the end-user.

Conclusion

While the present invention has been particularly shown and described with reference to the preferred embodiments thereof, various changes in form and details can be made without departing from the spirit and scope of the invention. In particular, while the preferred embodiment of the invention is directed to processing and distributing data related to financial offerings, the present method and system can also be used to permit real-time distribution of data objects directed to different subject matter, such as distributed inventory systems, network-based auction systems, remote data monitoring, etc.

The invention claimed is:

1. A method for processing raw data streams carrying a plurality of raw data objects containing information which is subject to periodic updates, the method comprising the steps of:
   receiving a raw data object carried on a raw data stream input;
   processing the received raw data object to determine an object type of the raw data object;
   generating a formatted data object based on contents of the raw data object by applying a set of formatting rules;
   receiving a request from a client manager for a snapshot of a current state of the formatted data object;
   transmitting the snapshot to the client manager on a channel;
   determining whether a prior version of the formatted data object is present in an object storage pool;
      upon determining that a prior version is present in the object storage pool:
         determining a data differential between the formatted data object and the prior version;
         updating the prior version of the formatted data object to correspond with the formatted data object; and
         broadcasting the data differential on an output broadcast data channel, the data differential including differential pricing data, wherein the output broadcast data channel transmitting the data differential is separate from the channel transmitting the snapshot;
         wherein the client manager:
            receives the data differential;
            uses a unique profile key to load a profile of a subscriber associated with the unique profile key, the profile including subscription selections; and
            sends the data differential to the subscriber according to the subscription selections in the profile;
      otherwise, upon determining that no prior version is present in the object storage pool:
         providing the formatted data object to subscriber processes; and
         storing the formatted data object in the object storage pool.

2. The method of claim 1, wherein the formatted data object stored in the object storage pool has an associated sequence number, wherein the step of updating includes incrementing the sequence number of the formatted data object, and wherein broadcasting the data differential includes broadcasting the sequence number associated with the formatted data object.

3. The method of claim 1, wherein the step of providing the formatted data object comprises broadcasting the formatted data object on the output broadcast channel.

4. The method of claim 1, wherein the broadcast channel is selected from a plurality of broadcast channels according to the object type.

5. The method of claim 1, wherein the applied formatting rules are selected in accordance with the determined object type.

6. The method of claim 1, further comprising translating the raw data object into a raw event comprising at least one name-value pair prior to determining an object type of the raw data object and generating a formatted data object.

7. The method of claim 1, further comprising the steps of:
validating the contents of the raw data object; and
upon a failed validation, preventing subsequent broadcast of the data differential or formatted data object derived from the respective raw data object.

8. The method of claim 1, further comprising:
receiving a particular formatted data object at a subscriber process;
storing the received formatted data object in a database associated with the subscriber process;
receiving at the subscriber process a data differential for the particular formatted object via the broadcast data channel; and
updating the stored formatted data object in accordance with the received data differential.

9. The method of claim 8, wherein the broadcast data channel is received by a plurality of subscriber processes.

10. The method of claim 8, wherein each of the subscriber processes receives a plurality of broadcast channels.

11. The method of claim 8, further comprising communicating information about the formatted data object stored in the database associated with the subscriber process to a remote location.

12. The method of claim 1, wherein the raw data object comprises information related to a financial product offering.

13. A system for processing information comprising:
at least one computer processor;
an information manager, using the at least one computer processor, configured to:
   receive a raw data object carried on a raw data stream input,
   process the received raw data object to determine an object type of the raw data object,
   generate a formatted data object based on contents of the raw data object by applying a set of formatting rules,
   receive a request from a client manager for a snapshot of a current state of the formatted data object,
   transmit the snapshot to the client manager on a channel,
   determine whether a prior version of the formatted data object is present in an object storage pool, upon determining that a prior version is present in the object storage pool:
      determine a data differential between the formatted data object and the prior version,
      update the prior version of the formatted data object to correspond with the formatted data object, and
      broadcast the data differential on an output broadcast data channel, the data differential including differential pricing data, wherein the output broadcast data channel transmitting the data differential is separate from the channel transmitting the snapshot,
   upon determining that no prior version is present in the object storage pool:
      provide the formatted data object to subscriber processes, and
      store the formatted data object in the object storage pool; and
the client manager configured to:
   receive the data differential,
   use a unique profile key to load a profile of a subscriber associated with the unique profile key, the profile including subscription selections, and
   send the data differential to the subscriber according to the subscription selections in the profile.

14. The system of claim 13, wherein the formatted data object stored in the object storage pool has an associated sequence number, wherein the information manager is further configured to:
   increment the sequence number of the formatted data object, and
   broadcast the sequence number associated with the formatted data object.

15. The system of claim 13, wherein the information manager is further configured to broadcast the formatted data object on the output broadcast channel.

16. The system of claim 13, wherein the broadcast channel is selected from a plurality of broadcast channels according to the object type.

17. The system of claim 13, wherein the applied formatting rules are selected in accordance with the determined object type.

18. The system of claim 13, wherein the information manager is further configured to translate the raw data object into a raw event comprising at least one name-value pair prior to determining an object type of the raw data object and generating a formatted data object.

19. The system of claim 13, wherein the information manager is further configured to:
   validate the contents of the raw data object, and
   upon a failed validation, prevent subsequent broadcast of the data differential or formatted data object derived from the respective raw data object.

20. The system of claim 13, wherein the raw data object comprises information related to a financial product offering.

* * * * *